United States Patent Office 3,234,042
Patented Feb. 8, 1966

3,234,042
METHOD FOR IMPROVING THE ADHESION OF VINYL POLYMERS TO GLASS FIBERS BY THE USE OF NITROGEN COMPOUNDS
Alfred Marzocchi, Cumberland, R.I., and Richard C. Horton, Millwood, N.Y., assignors to Owens-Corning Fiberglas Corporation, Toledo, Ohio, a corporation of Delaware
No Drawing. Filed Mar. 16, 1961, Ser. No. 96,106
2 Claims. (Cl. 117—126)

This invention relates to glass fibers coated with vinyl polymers, and it relates more particularly to structures formed of glass such as textiles, mats, strands, yarns, fabrics, and foliated glass which are coated or combined with a vinyl polymer having incorporated therein a substance which enhances the bonding relationship between the polymeric material and the surfaces of the glass fibers or foils, hereafter included as glass fibers.

It is an object of this invention to produce vinyl-coated glass fibers characterized by an improved adhesion of the vinyl polymeric coating to the glass fiber surfaces and by improved strength characteristics and improved dimensional stability for the coated product, even under conditions of high temperature and excessive humidity.

These and other objects and advantages of this invention will hereinafter appear, and for purposes of illustration, but not of limitation, the invention will be described with reference to various exemplary embodiments.

It has long been appreciated that certain synthetic resinous materials, such as vinyl polymers, could beneficially be employed as coatings on glass fiber surfaces, but difficulties have been encountered in the attempts firmly and permanently to tie in coatings to such glass surfaces. A somewhat similar relationship in terms of the difficulty of effecting a desirable bond has been evidenced in systems wherein glass fibers have been utilized as reinforcements for synthetic resinous materials in the manufacture of reinforced plastics and laminates. These difficulties appear to arise from the problems in achieving a strong and permanent bond between the resinous polymeric materials and glass fiber surfaces. The deficiency with respect to the bonding relationship between the glass fiber surfaces and the resinous materials is believed to be attributable at least in part to the inability to achieve physical anchorage of the resinous material to the perfectly smooth surfaces of the non-porous glass fibers and further to the difficulty in securing a strong chemical bond between the resinous component and the hydrophilic surfaces of the glass fiber which are relatively more receptive to moisture than to the organic polymeric coating, such that whatever bonding relation was capable of being achieved in the dry state would be weakened or even displaced by a water film when exposed to high humidity.

This invention is addressed to overcoming the aforementioned difficulties by the formulation of the vinyl polymeric coating with a compound which is compatible with the resinous coating material yet which is capable of providing a preferential anchorage to the glass fiber surfaces. More specifically, it has been found that organic nitrogenous compounds which are characterized both by an organic constitution which is compatible with the vinyl polymers and by a polarity expressed in the nitrogen function, such that a chemical attraction for the glass surface is achieved, are eminently suitable to effect the desired improved bonding relation.

Organic nitrogenous compounds of this type include amines, imines, amides, imides, nitrides, isocyanates, and the like, and polymeric organic compounds which include these functionalities. For example use can be made of primary, secondary, and tertiary aliphatic amines such as monomeric vinyl pyrrolidone, propylamine, polyamines, polyvinyl pyrrolidone acrylamide, aminopolyethylene, polyvinyl pyridine, polyacrilonitriles, aminotriazine resins, urea-aldehyde resins, amino alcohols, amino carboxylates, hexamethylenediamines, isocyanates, polyisocyanates, amido isocyanate co-condensation products, diphenyl guanidine, ammonium ricinoleate, and polyesterisocyanate polymers. It has been found that the polyester-isocyanate polymer, when present in an amount ranging from 2–10% of the polyvinyl coating material and preferably when present as 3–5% of the coating material, is an especially suitable additive for incorporation in the polymeric coating, since the utilization of compounds of this type appears to result in a coating which is characterized by a markedly improved toughness and stability in addition to enhancing the bonding relation between the applied coating that the glass fiber surfaces. Others of the organic nitrogenous compounds may be employed in similar amounts based upon the vinyl polymeric component of the coating composition.

As the vinyl polymer coating materials with which the nitrogenous additive is employed, this invention contemplates the use of polyvinyl chlorides, polyvinyl acetates, polyvinylidene chlorides, polyvinyl alcohols, polyvinyl ethers, polyvinyl acetals, polyvinyl acrylates, polyvinyl methacrylates, and the like and substituted polymers and co-polymers thereof. Such coating materials may be applied as coatings to the glass fiber surfaces in various manners well known to the art, such as by spray coating, dip coating, fluidized bed coating, and the like, but it is preferred to apply the polyvinyl coating from a plastisol disperson of the polymer. This preferred technique allows for the ready incorporation of the organic nitrogenous compound in the plastisol dispersion in the desired concentration to enhance the bonding relationship of the coating compound on the glass.

The following formulations are given by way of illustration and not by way of limitation:

*Example 1*

| | Parts by weight |
|---|---|
| Polyvinyl chloride (Opalon 410) | 100 |
| Undecyl benzyl phthalate (Santicizer 213) | 6 |
| Tri-ortho phosphate | 21 |
| Epoxidized tall oil ester [1] (Monoplex S-73; Rohm & Haas) | 21 |
| Paste aluminum pigment | 4 |
| Antimony oixde, flame retardant (99% antimony oxide) | 2 |
| Heat stabilizer (12U6) | 2 |
| Coupler (cadmium-barium coupler (19U1)) | 1 |
| 2-hydroxy, 4-methoxy benzophenone (ultraviolet stabilizer) | 0.5 |
| Hydrocarbon thinner [2] | 5 |

[1] See the following table:

| | |
|---|---|
| Mol. wt. | 420 |
| Gardner color | 1 |
| Sp. gr. (25° C./15° C.) | .918 |
| Viscosity (poises 25° C.) | .25 |
| Refractive index | 1.457 |
| Freezing pt. (° C.) | −7 |
| Flash pt. (° C.) | 235 |
| Acid No., mg. KOH/g. | .3 |
| Saponification No., mg. KOH/gr. | 144 |

[2] See the following table:

| | |
|---|---|
| API gravity | 50.5 |
| Sp. gr. (60° F.) | .7775 |
| Aniline pt. | ° F. 102 |
| Flash pt. (TCC) | ° F. 60 |
| Distillation, ° F.: | |
| Initial B.P. | 250 |
| 10% | 260 |
| 50% | 274 |
| 90% | 287 |
| Dry pt. | 297 |

To this formulation were added 2–6 parts of an organic nitrogenous compound, as follows.

Example 2

The composition of Example 1, plus 4 parts by weight of phthalic alkyd polyester-tolyene diisocyanate polymer (Mondur CB, a polyisocyanate, mixed with Multron R-10 and R-12, a polyfunctional polyester, all of Mobay Chemical Company).

Example 3

The composition of Example 1, plus 2 parts by weight of naphthyl diisocyanate which was end-blocked by reaction with phenol.

In each of these instances, application of the resulting modified plastisols to glass fiber surfaces by conventional techniques yielded a coated product which exhibited good strength properties, dimensional stability, and resistance to humidity at temperatures ranging from room temperature to about 350° F.

It should be apparent that a new and novel means has been described for producing a vinyl coated glass fiber product and for effecting a suitable and desirable bonding of the vinyl coating to the glass surface by the provision of a nitrogenous organic compound in the polymeric vinyl coating, and especially by the combination to include an isocyanate-polyester with the vinyl polymer component in the plastisol coating dispersion.

It should be understood that changes may be made in the details of formulation for the various compositions and in their manner of application as well as in the types and combinations of glass fibers and polyvinyl coating materials, without departing from the spirit and the scope of the invention, especially as defined in the appended claims.

We claim:

1. The method of producing glass fibers coated with polyvinyl resin strongly bonded to the glass fiber surfaces, comprising the steps of incorporating a polyisocynate in the coating material for admixture with the polyvinyl resin, prior to the coating of the material onto the glass fiber surfaces, and in which the polyisocyanate is present in an amount within the range of 2-10 percent by weight of the polyvinyl resin.

2. The method of producing glass fibers coated with polyvinyl resin strongly bonded to the glass fiber surfaces, comprising the steps of incorporating a polyisocyanate-polyester polymer in the coating material for admixture with the polyvinyl resin, prior to the coating of the material onto the glass fiber surfaces, and in which the polyisocyanate-polyester polymer is present in an amount within the range of 2-10 percent by weight of the polyvinyl resin.

References Cited by the Examiner

UNITED STATES PATENTS

| | | | |
|---|---|---|---|
| 2,356,542 | 8/1944 | Sloan | 117—126 |
| 2,468,086 | 4/1949 | Latham et al. | 117—126 |
| 2,556,885 | 6/1951 | Ness | 117—126 |
| 2,606,162 | 8/1952 | Coffey et al. | 260—45.4 |
| 2,744,835 | 5/1956 | Caroselli | 117—126 |
| 2,780,612 | 2/1957 | Te Grotenhuis | 117—126 |
| 2,780,909 | 2/1957 | Biefeld et al. | 117—126 |
| 2,851,436 | 9/1958 | Forsythe | 260—45.4 |
| 2,853,465 | 9/1958 | Werner | 117—126 |
| 2,872,430 | 2/1959 | Parker | 260—45.4 |
| 2,888,433 | 5/1959 | Parker | 260—45.4 |
| 2,893,969 | 7/1959 | Graham et al. | 260—45.4 |
| 2,931,739 | 4/1960 | Margocchi et al. | 117—76 |
| 2,958,614 | 11/1960 | Perry | 117—76 |
| 2,976,182 | 3/1961 | Caldwell et al. | 260—45.4 |
| 2,981,637 | 4/1961 | Spencer et al. | 260—45.4 |

FOREIGN PATENTS

| | | |
|---|---|---|
| 203,836 | 12/1954 | Australia. |
| 535,229 | 1/1957 | Canada. |
| 585,083 | 1/1947 | Great Britain. |
| 638,118 | 5/1950 | Great Britain. |
| 813,603 | 5/1959 | Great Britain. |

RICHARD D. NEVIUS, *Primary Examiner.*

D. ARNOLD, *Examiner.*